Oct. 21, 1969  J. G. HAGERBORG  3,473,644
COOKER CONVEYOR CHAIN
Filed Sept. 27, 1967  2 Sheets-Sheet 2
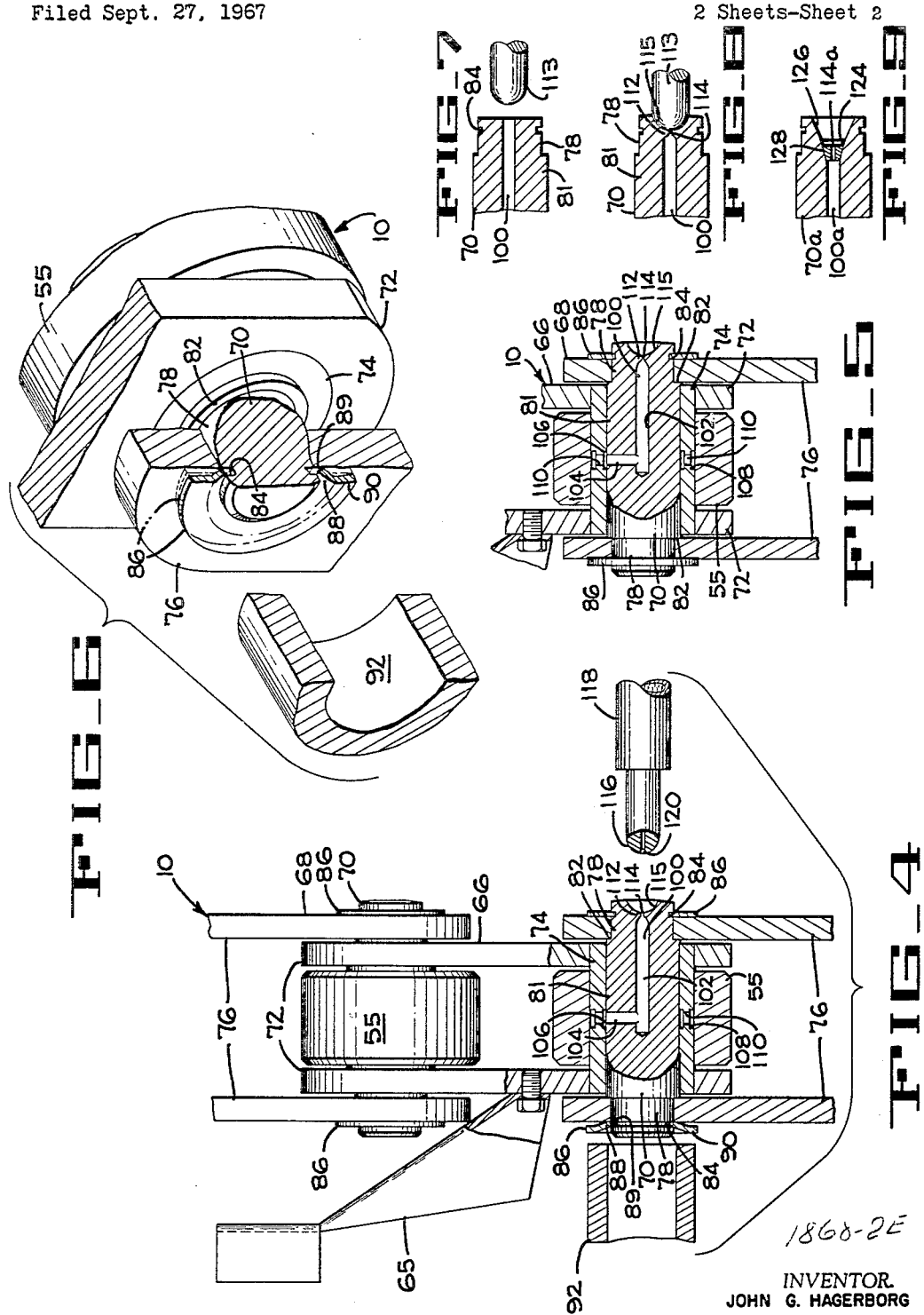
INVENTOR.
JOHN G. HAGERBORG
BY F. W. Anderson
C. E. Tripp
ATTORNEYS United States Patent Office 3,473,644
Patented Oct. 21, 1969

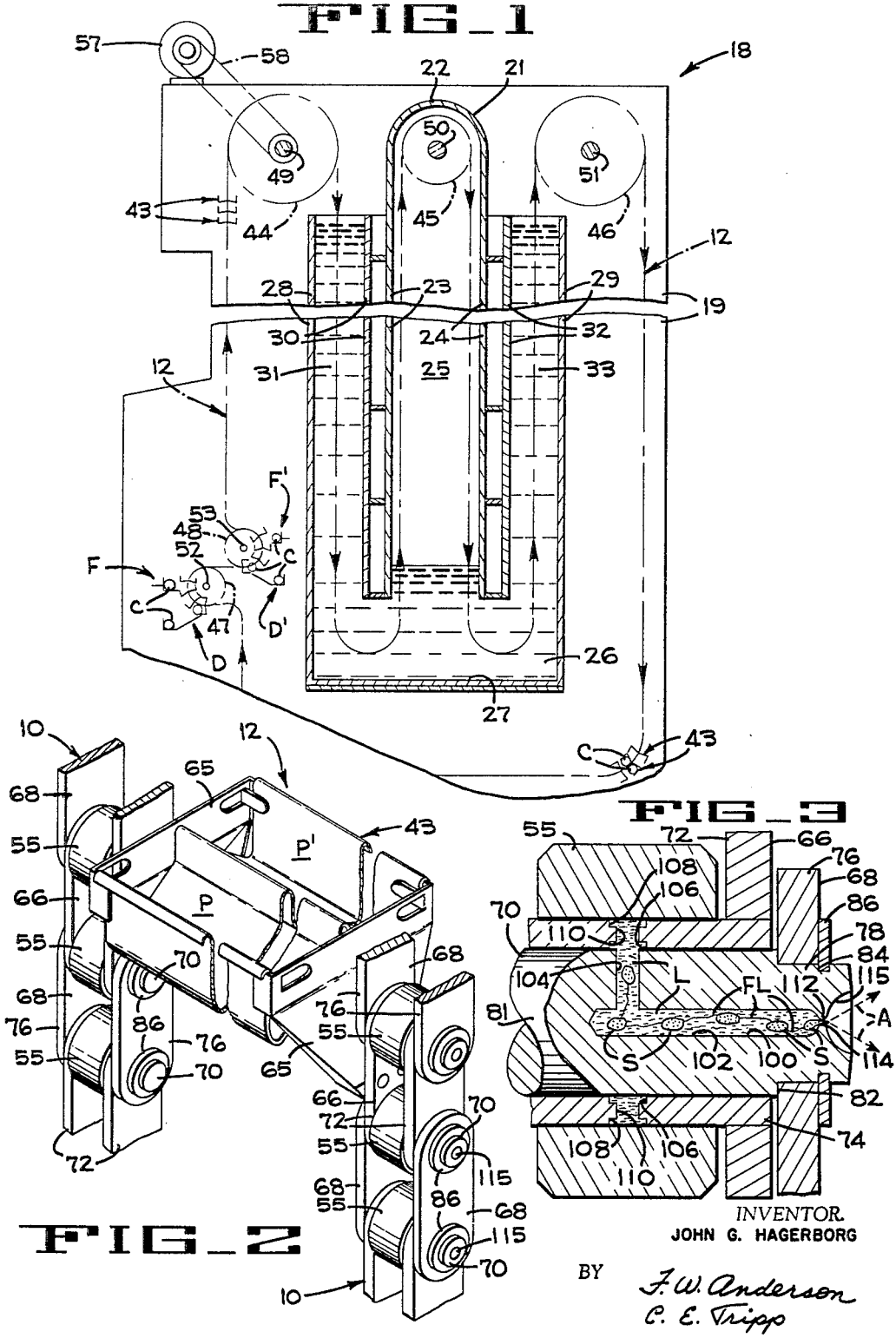

3,473,644
COOKER CONVEYOR CHAIN
John G. Hagerborg, St. Niklaas-Waas, Belgium, assignor to International Machinery Corporation, S.A., St. Niklaas-Waas, Belgium, a corporation of Belgium
Filed Sept. 27, 1967, Ser. No. 671,054
Int. Cl. B65g 17/16, 45/00
U.S. Cl. 198—140                                    9 Claims

ABSTRACT OF THE DISCLOSURE

A chain for a hydrostatic cooker having links interconnected with pivot pins which are bored to provide lubrication passages. Each passage is open at both ends, with one end opening into a bushing to be lubricated and the other or inlet end deformed to provide a restricted opening which permits gaseous vapor to escape from said passage but restricts the flow of lubricant therefrom. The pivot pins being of maximum diameter within said bushings and having annular grooves near the ends thereof which receive the inner peripheral portions of frustoconical locking rings upon applying sufficient force to the rings to flatten the same thereby locking the pivot pins from axial movement relative to their bushings.

Cross-reference to related applications

The subject conveyor chain is designed for use in the type of cooker disclosed in copending Mencacci et al. application Ser. No. 390,880 which was filed on Aug. 20, 1964 and is assigned to the assignee of the present invention, said application issued on Oct. 17, 1967 as Patent No. 3,347,351.

Background of the invention

This invention pertains to an improved conveyor chain for a hydrostatic cooker and more particularly relates to improved means for lubricating the joint between adjacent links and for locking the pivot pin at each joint from axial movement relative to the associated links.

The processing conveyor of this type of cooker includes a plurality of carriers each of which is usually about seven feet long and supports in excess of about 60 pounds of filled containers being processed. The carriers are evenly spaced, as for example, three carriers per foot along the processing conveyor, and the processing conveyor has a plurality of vertical runs that are about 60 feet tall. Thus it is apparent that the chain links at the upper end of each 60 foot vertical run supports a very substantial weight, and if not properly lubricated will wear quite rapidly.

The conveyor is continuously driven along a circuitous path so that each carrier receives a row of containers at substantially atmospheric temperature and pressure when moving around sharp curves at a feed station, advances the carriers and containers downwardly into a pre-heating housing or entry zone which gradually heats the containers and carriers to about 238° F. to 263° F., then advances the carriers and containers upwardly and thereafter downwardly through a steam chamber or cooking zone maintained at about 250° F. to 275° F., then moves the containers and carriers upwardly through a cooling housing or exit zone filled with a column of water which gradually cools the containers and carriers to about 210° F., then returning the carriers to the feed and discharge stations where the rows of processed containers are discharged in response to the carriers moving around a sharp curve and where new rows of unprocessed containers are fed into each carrier at which time the above cycle of operation is again repeated.

As indicated above each link on the two chains of the processing conveyor moves through liquid and vapor heat treatment mediums which vary in pressure from atmospheric pressure to about 31 p.s.i.g., which is the pressure of saturated steam at about 275° F., during each complete cycle of operation. It is known that water or water vapors enter the lubricant passages of the chain links during movement through the aqueous cooking mediums. When this liquid or vapor is trapped in the passage by the usual lubricant fitting screwed into one end of the passage, which fittings are of the type that allow grease to be forced into the passage but prevents flow of fluids past the grease fitting out of the passage, it has been discovered that this trapped liquid vaporizes into gas pockets as it is moved out of the high pressure and high temperature atmosphere in the steam chamber and enters a lower pressure exit zone in the cooker. This expanding vapor forces the grease out of the lubricant passage as the links continue to move into lower pressure zones of the cooker thus causing the joints of the links to thereafter operate without proper lubrication.

Summary of the invention

The improved chain of the present invention is designed for use in a hydrostatic cooker or similar apparatus wherein each chained link is moved through aqueous heat treatment mediums, such as water or steam, and wherein the treatment mediums vary considerably in temperature and pressure therein. In accordance with the present invention the pivot pins of each link is provided with a lubricant passage that is open at both ends, the opening at the grease inlet end being in the form of a neck having a restricted opening therein to prevent flow of lubricant out of the inlet end of the lubricant passage yet allow condensible gases to freely flow therefrom. Thus, trapped pockets of high pressure steam will not form in the lubricant passage and will not prematurely force the lubricant therefrom as the link moves into a lower pressure area of the cooker. Laboratory tests indicate that use of the above type of lubricant passages with a suitable high temperature grease, such as Molytone 265 as manufactured by Rocal Ltd. of Swillington, England, will require greasing only once every ten days when operating sixteen hours per day and when the restricted opening or neck is about two millimeters in diameter.

The improved chain of the present invention is also inexpensive in construction since it eliminates the need for a grease fitting and threaded opening for each pivot pin. Since about 4000 pivot pins are used on each standard hydrostatic cooker conveyor, the omission of the grease fittings amounts to a considerable saving in manufacturing costs. The cost of the chain is also reduced by providing inexpensive deformable frustoconical locking rings of relatively inexpensive carbon or stainless steel, which rings are flattened by pressure during assembly causing their inner peripheries to project into annular grooves in the pins thereby locking the pins from axial movement relative to the associated links.

Brief description of the drawings

FIGURE 1 is a diagrammatic central vertical section illustrating a hydrostatic cooker with a processing conveyor movable therethrough, which processing conveyor includes two of the endless chains of the present invention.

FIGURE 2 is a perspective of a portion of the processing conveyor showing a carrier connected to the two chains of the processing conveyor, the central portion of the carrier being cut away.

FIGURE 3 is an enlarged central section through one of the pivot pins of the chain links illustrating the lubricant passage and the manner in which aqueous vapors escape from the passage.

FIGURE 4 is a side elevation of several links with one of the link joints being shown in central section, said view illustrating one of the pin locking rings in its frusto-conical shape prior to being flattened into locking engagement with one end of the associated pivot pin, said view also illustrating a fragment of a grease gun for directing grease into the lubricant passage in the pin.

FIGURE 5 is a side elevation similar to FIGURE 4 but showing the locking ring flattened and in locking engagement with the associated pin.

FIGURE 6 is a perspective of one of the locking rings as the ring appears prior to being flattened during assembly.

FIGURE 7 is a central section through a fragment of one of the pins illustrating the lubrication passage before the end is restricted by a pressure applying tool.

FIGURE 8 is a central section similar to FIGURE 7 showing a pressure tool forming the restricted opening.

FIGURE 9 is a central section illustrating another way to form a restricted opening in a lubricant passage.

Description of preferred embodiment

The improved conveyor chain 10 of the present invention is especially suited for use in the processing conveyor 12 of a hydrostatic cooker 18. The hydrostatic cooker 18 (FIG. 1) is of standard well known design and may be of the type disclosed in United States Patent No. 3,031,065 which issued to John F. French on Apr. 24, 1962. The hydrostatic cooker 18 comprises, in general, a pair of spaced vertically extending side walls 19 (only one being shown in FIGURE 1) suitably supported in an upright position. A housing 21, which extends between walls 19, has a rounded upper end 22 and two depending walls 23 and 24 which cooperate with walls 19 to define a cooking zone or chamber 25 which is filled by means of conduits (not shown) with steam at a predetermined cooking pressure and temperature, for example, at 275° F. and 30 p.s.i. gauge. The lower end of the housing 21 opens into a water filled trough 26 which is formed by the side walls 19, a transverse horizontal plate 27, and the lower end portions of two transverse vertical walls 28 and 29. The wall 28 cooperates with another transverse vertical wall 30 to define an entry zone or inlet hydrostatic water leg 31, and the wall 29 cooperates with a transverse vertical wall 32 to provide an exit zone or outlet hydrostatic water leg 33. The hydrostatic legs 31 and 33 communicate with trough 26 and are filled with water so as to create sufficient pressure to resist the steam pressure in the cooking chamber 25. The inlet hydrostatic water leg 31 is thermostatically controlled to provide a gradually increasing water temperature from approximately 210° F. at its upper end to approximately 275° F. at its lower end. The outlet water leg 33 is also thermostatically controlled to provide a gradual decrease of water temperature from approximately 275° F. at its lower end to any suitable temperature below the boiling point of water at atmospheric pressure, depending upon the type of containers being handled, at the upper end thereof. Steam is added to the water in the hydrostatic inlet leg 31 to provide the desired temperature therein, and cold water is directed into the outlet or cooling leg 33 to provide the desired cooling temperature therein.

Rows of containers to be processed are carried through the cooker by the endless conveyor 12. The conveyor 12 comprises a pair of endless chains 10 (FIG. 2) of the present invention which have a plurality of elongated spaced carriers 43 mounted therebetween. The chains 10 are trained around transversely aligned pairs of sprockets 44, 45, 46, 47 and 48 (only one sprocket of each pair being shown in FIGURE 1) which are keyed to shafts 49, 50, 51, 52 and 53 respectively, that are journaled in the side walls 19 and 20. The chains 10 are guided along tortuous paths by channel tracks (not shown) which tracks are secured to the fame of the cooker and are arranged to receive rollers 55 carried by the chains. A motor 57 (FIG. 1 is connected to the shaft 49 by a chain drive 58 which drives the conveyor 12 continuously in the direction of the arrows indicated on the pitch line shown in FIGURE 1 which indicates the path of travel of the conveyor. If desired, the shafts 51 and 52 may also be driven by extensions of the chain drive 58.

The carriers 43 may be of any well known type, and as shown, each carrier has two pockets P and P' formed therein each of which accommodates a row of containers C. The carriers are attached to the chains 10 by any suitable carrier mountings such as by brackets 65 that are bolted to the chains at evenly spaced intervals.

Each improved chain 10 (FIGE. 2–5) of the present invention includes a plurality of narrow links 66 and wide links 68 pivotaly connected together by pivot pins 70. Each narrow link 66 includes a pair of narrow link arms 72 that are apertured near their ends to firmly receive the end portions of bushings 74 and to hold the bushings from pivotal movement relative thereto. The aforementioned rollers 55 are journaled on the bushings 74.

Each wide link 68 comprises a pair of wide link arms 76 that are apertured near the ends thereof to receive, and hold from rotation relative thereto, reduced diameter end portions 78 of associated pivot pins 70. A large diameter central portion 81 of each pin 70 is pivotally received within the associated bushing 74. As indicated in FIGURES 4 and 5, the inner surfaces of wide arms 76 bear against annular shoulders 82 of the pin 70 when in assembled position, and the outer surfaces of the wide arms are aligned with annular locking grooves 84 formed in the reduced diameter end portions 78 of the pins 70.

Locking rings 86 are provided for locking the pins 70 from axial movement relative to the associated wide links 68. Each locking ring 86 (FIGS. 4 and 6) comprises a frusto-conical inner portion 88 having an aperture 89 with an inside diameter slightly larger than the reduced diameter end portions 78 of the pins 70. The frusto-conical portion is formed integrally with a larger diameter planar portion 90 of the ring 86. During assembly of the chain links, a locking ring 86 is placed over each locking groove 84, and a tubular pressure applying tube 92 (FIGS. 4 and 6) is forced against each ring 86 with the pressure in the range of about 4,000 to 5,000 pounds thereby flattening the ring against the associated wide link arm 76 causing the diameter of the ring aperture 89 to reduce in size and enter the associated annular locking groove 84 as indicated by the flattened locking rings shown in FIGURE 5 thereby positively locking the wide links from axial movement relative to their associated pins. It will be noted that the annular shoulders 82 prevent the outer link arms from being pressed into abutting engagement with the bushing 74 or narrow link arms 72.

In order to lubricate the bearing surfaces between the rollers 55 and the bushings 74, and between the bushings 74 and pins 70, each pin is provided with a lubricant passage 100 (FIGS. 3–5). It is an important feature of the invention that the lubricant passage in each pin 70 is open at both ends thus allowing aqueous liquids or vapors which enter the passage 100 to escape from either end of the passage when this liquid vaporizes into steam; or stated in another way, preventing a steam pocket or pockets S (FIG. 3) which may be interconnected by flow line FL from being trapped near one end of the passage thereby prematurely forcing the lubricant L out of the other end of the passage as indicated by arrows A when the pockets of steam S expands due to movement of the associated link section from a high temperature-high pressure zone to a lower pressure zone of the cooker.

In this regard, the passage 100 includes an axial portion 102 which is drilled axially from one end of the pin to a point slightly past the midpoint thereof. A radial portion 104 of the passage 100 has one end communicating with the axial portion and the other end opening through the periphery of the large diameter central portion 81 of the pin intermediate the ends thereof. A shallow inner groove 106 is cut in the inner peripheral surface of the bushing 74 and is aligned with the radial portion 104 to receive grease therefrom and distribute a portion of the grease to the bearing surface between bushing 74 and pin 70. An outer groove 108 is formed in the outer peripheral surface of the bushing 76 and is connected in flow communication with the inner groove 106 by a plurality of ports 110 (only two being shown in FIGURE 5) thereby directing a portion of the grease to the bearing surface between the roller 55 and bushing 74.

The inner end of the axial portion 102 of the lubricant passage 100 is restricted by a necked down portion 112. This necked down portion may be formed by any suitable means, but is preferably formed by deforming the metal at the inlet end of the passage 100 by means of a tool 113 (FIGS. 7 and 8) having a hemispherical end which is forced against the inlet end of the passage with sufficient force to form a restricted opening 114 in the neck 112. In addition to forming the restricted opening 114 in the neck 112, the hemispherical tool 113 also leaves a generally hemispherical cavity 115 at the inlet end of the passage 100, which cavity is adapted to receive the hemispherical end 116 of a grease gun 118 (FIG. 4) of any suitable well known type. The opening 120 in the end of the grease gun 118 is preferably slightly larger than the restricted opening 114 so that grease will freely flow into the opening 114 during the grease replenishing operation even though the grease gun is not in exact axial alignment with the pin being lubricated.

When the improved chain 10 of the present invention is used in a hydrostatic cooker having the varying pressures and temperatures mentioned above, it has been found that a restricted aperture 114 of about 2 millimeters in diameter requires greasing only once every ten days when operating at about 16 hours per day.

A modified pin 70a having a lubricant passage 100a is illustrated in FIGURE 9 and includes a pair of frustoconical boxes 124 and 126 in the end of the passage 100a having a frustoconical plug 128 press fitted in the bore 124 and having a restricted opening 114a therein.

In operation of the hydrostatic cooker, rows of containers C (FIG. 1) to be processed are loaded into the pockets P of carriers 43 at a first feed station F and are loaded into the pockets P' of carriers 43 at a second feed station F'. The conveyor 12 is continuously driven through the cookers in the direction indicated by the arrows. These loaded carriers first enter the inlet hydrostatic leg 31 and then enter the steam chamber 25 thus heating the containers and adjacent parts of the conveyor 12 from about atmospheric temperature to about 275° F. and changing the pressure from atmospheric to about 30 p.s.i.g. During passage through the leg 31 and cooking chamber 25, water or water vapors in the form of steam S (FIG. 3) may enter the lubrication passages 100 and mingle with the lubricant L therein. Upon moving out of the cooking chamber 25 and into the hydrostatic cooling leg 33, the pressure acting on the external surfaces of the conveyor reduce and reach atmospheric pressure when the carriers emerge from the upper end of the cooling leg. Although the conveyor and pins are slowly cooled during this time, the cooling rate is retarded by the lubricant and by the metal thickness, and accordingly, is not sufficient to prevent vaporization and subsequent expansion into steam pockets S (FIG. 3) of the aqueous liquid which previously entered the lubrication passage 100. However, since the inlet end of each passage does not positively block the flow of fluid out of the inlet end, as would occur if a grease fitting was inserted therein, the restricted opening 114 in the necked down portion 112 permits the vaporized liquid or steam S formed in the lubricant passage 100 to flow out of the passage through the restricted opening as indicated by arrows A. Very little if any lubricant L will be forced past the restricted opening 114 because of its much greater viscosity and surface tension.

The carriers 43 and containers therein are then moved to a first discharge station D where the containers are discharged from carrier pockets P, and are then advanced into a second discharge station D' where the processed containers in pockets P' are discharged. The cycle of operation is then repeated for other rows of containers which are fed into the pockets P and P' of carriers 43 at feed stations F and F', respectively.

From the foregoing description it is apparent that the improved chains of the present invention includes inexpensive deformable frusto-conical lock rings for locking the pivot pins in place, and also includes a lubrication passage within each pin that is open at both ends thus permitting any steam which might form in the lubricant passage to flow out of either end of the passage without building up a pressure therein which would prematurely force the lubricant from the passage.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a conveyor for a cooker of the type having a plurality of processing zones including entry and exit zones and an intermediate cooking zone maintained at a high temperature and at a superatmospheric pressure, spaced endless carrier chains guided along a circuitous path through the cooker zones, each chain having a plurality of links connected by pins and bushings and lubrication means in the pins; the improvement wherein the lubrication means are provided for relieving vapor trapped in the lubricant without significant loss of lubricant, each lubrication means comprising a lubricant passage extending from one end of the pin to the bushing, and means defining a restricted opening in said lubricant passage near said one end of the pin for admission of lubricant under pressure, said restricted openings obstructing the flow of lubricant from within said lubricant passage under vapor pressure developed by aqueous fluid trapped in the lubricant, said restricted opening accommodating escape of vapor trapped within said passage after the pin leaves said cooking zone, said restricted opening being about two millimeters in diameter.

2. In a conveyor for a cooker of the type having a plurality of processing zones including entry and exit zones and an intermediate cooking zone maintained at a high temperature and at a superatmospheric pressure, spaced endless carrier chains guided along a circuitous path through the cooker zones, each chain having a plurality of links connected by pins and bushings and lubrication means in the pins; the improvement wherein the lubrication means are provided for relieving vapor trapped in the lubricant without significant loss of lubricant, each lubrication means comprising a lubricant passage extending from one end of the pin to the bushing, and means defining a restricted opening in said lubricant passage near said one end of the pin for admission of lubricant under pressure, said restricted openings obstructing the flow of lubricant from within said lubricant passage under vapor pressure developed by aqueous fluid trapped in the lubricant, said restricted opening accommodating escape of vapor trapped within said passage after the pin leaves said cooking zone, said restricted opening being defined by a portion of said one end of said pin which end includes said restricted opening and a hemispherical cavity opening outwardly out of said pin from said restricted opening, said restricted opening being about two millimeters in diameter.

3. In a conveyor for a cooker of the type having a plurality of processing zones including entry and exit zones and an intermediate cooking zone maintained at a high temperature and at a superatmospheric pressure, spaced endless carrier chains guided along a circuitous path through the cooker zones, each chain having a plurality of links connected by pins and bushings and lubrication means in the pins; the improvement wherein the lubrication means are provided for relieveing vapor trapped in the lubricant without significant loss of lubricant, each lubrication means comprising a lubricant passage extending from one end of the pin to the bushing, and means defining a restricted opening in said lubricant passage near said one end of the pin for admission of lubricant under pressure, said restricted openings obstructing the flow of lubricant from within said lubricant passage under vapor pressure developed by aqueous fluid trapped in the lubricant, said restricted opening accommodating escape of vapor trapped within said passage after the pin leaves said cooking zone, each of said bushings including means defining an annular groove in its internal surface and disposed in flow communication with said lubricant passage, means defining an annular groove in its external surface, means defining a port between said grooves, and a roller journaled on said bushing.

4. In a conveyor for a cooker of the type having a plurality of processing zones including entry and exit zones and an intermediate cooking zone maintained at a high temperature and at a superatmospheric pressure, spaced endless carrier chains guided along a circuitous path through the cooker zones, each chain having a plurality of links connected by pins and bushings and lubrication means in the pins; the improvement wherein the lubrication means are provided for relieving vapor trapped in the lubricant without significant loss of lubricant, each lubrication means comprising a lubricant passage extending from one end of the pin to the bushing, and means defining a restricted opening in said lubricant passage near said one end of the pin for admission of lubricant under pressure, said restricted openings obstructing the flow of lubricant from within said lubricant passage under vapor pressure developed by aqueous fluid trapped in the lubricant, said restricted opening accommodating escape of the vapor trapped within said passage after the pin leaves said cooking zone, each of said pins having a maximum diameter portion disposed between its ends and within said bushing, each link including a pair of wide link arms and a pair of narrow link arms, means defining shoulders and reduced diameter end portions at each end of said pin for accepting said wide link arms, means defining a groove in each end disposed outwardly of the adjacent wide link arm, and pressure deformable lock rings fitted over the reduced diameter end portions and deformed by application of pressure to partially enter the associated groove thereby locking the wide arms to said pin from axial movement relative thereto.

5. An apparatus according to claim 4 wherein said grooves are annular grooves, and wherein said locking rings include a frustoconical portion having an internal diameter slightly larger than said reduced diameter portion and a planar portion formed integrally therewith, and wherein said application of pressure deforms said frustoconical portion so that said frustoconical portion assumes a flat condition lying in the same plane as said planar portion.

6. An apparatus according to claim 3 wherein each of said pins has its maximum diameter portion disposed between its ends and within said bushing, each link including a pair of wide link arms, means defining shoulders and reduced diameter end portions at each end of said pin for accepting said wide link arms, means defining a groove in each end portion disposed outwardly of the adjacent wide link arm, and pressure deformable lock rings fitted over the reduced diameter end portions and partially positioned within the associated groove when deformed thereby locking the wide arms to said pin from axial movement relative thereto.

7. In a conveyor for a cooker of the type having a plurality of processing zones which vary in temperature and pressure; two spaced endless chains guided along a circuitous path through the cooker; each chain being formed by a plurality of inner links having inner link arms connected to bushings near the ends thereof and wide links pivotally connected to the inner links by pivot pins pivotally received in the bushings and defining pivot axes; and lubricating means in said pivot pins and communicating with said bushings; the improvement wherein each of said pins has its maximum diameter portion disposed within its ends and within said bushing, means defining shoulders and reduced diameter end portions at each end of said pin for accepting said wide link arms, means defining a groove in each end portion disposed outwardly of the adjacent wide link arm, and pressure deformable locking rings fitted over the reduced diameter end portions and partially positioned within the associated groove thereby locking the wide arms to said pin from axial movement relative thereto, said lubricating means in each pin defining a passageway which communicates with said bushing and with one end of said pin and a restricted opening near said one end having a diameter of about two millimeters.

8. In a conveyor movable through zones which vary in pressure and temperature and in which at least one high pressure zone contains an aqueous medium, an endless chain guided along a circuitous path through the zones, each chain having a plurality of links connected by pins and bushings and lubrication means in the pins; the improvement wherein the lubrication means are provided for relieving vapor trapped in the lubricant without significant loss of lubricant, each lubrication means comprising a lubricant passage extending from one end of the pin to the bushing, and means defining a restricted opening in said lubricant passage near said one end of the pin for admission of lubricant under pressure, said restricted opening being about two millimeters in diameter and obstructing the flow of lubricant from within said lubricant passage under vapor pressure developed by aqueous fluid trapped in the lubricant, said restricted opening accommodating escape of vapor trapped within said passage after the pin leaves said one high pressure zone.

9. A method of manufacturing a lubrication passage in an elongated cylindrical pivot pin having an end and a cylindrical surface, comprising the steps of boring an axial passageway into the pin through an end thereof, boring a radial passageway into the pin through the cylindrical surface for establishing communication with said axial passageway, and deforming the material around the end of the axial passageway to provide a restricted opening having a diameter of about two millimeters and defining a hemispherical cavity opening outwardly of the pin from the restricted opening.

References Cited

UNITED STATES PATENTS

| 902,205 | 10/1908 | Brown | 85—8.6 X |
| 1,385,968 | 7/1921 | Newhouse | 308—113 X |
| 2,421,115 | 5/1947 | Carlson | 85—8.6 X |

FOREIGN PATENTS

| 747,226 | 6/1933 | France. |
| 1,745 | 1862 | Great Britain. |

EDWARD A. SROKA, Primary Examiner

U.S. Cl. X.R.

29—149.5; 74—257; 85—8.9; 308—113

PO-1050
(5/69)

UNITED STATES PATENT OFFICE
CERTIFICATE OF CORRECTION

Patent No. 3,473,644　　　　　　　　　　Dated October 21, 1969

Inventor(s) J. G. HAGERBORG.

It is certified that error appears in the above-identified patent and that said Letters Patent are hereby corrected as shown below:

Column 3, line 72, change "fame" to "frame". Column 4, line 12, change "FIGE." to "FIGS."; line 14, change "pivotaly" to "pivotally". Column 7, line 5, change "relieveing" to "relieving".

Signed and sealed this 13th day of July 1971.

(SEAL)
Attest:

EDWARD M. FLETCHER, JR.　　　　　　　　WILLIAM E. SCHUYLER, JR.
Attesting Officer　　　　　　　　　　　Commissioner of Patents